Jan. 6, 1970 EISUKE FUJIMOTO 3,488,750

AUTOMATIC SOUND VOLUME CONTROL ARRANGEMENT PRESERVING RELATIVE MAGNITUDES OF INPUT SIGNALS

Filed Nov. 2, 1966 3 Sheets-Sheet 1

INVENTOR
EISUKE FUJIMOTO

Jan. 6, 1970 EISUKE FUJIMOTO 3,488,750

AUTOMATIC SOUND VOLUME CONTROL ARRANGEMENT PRESERVING RELATIVE MAGNITUDES OF INPUT SIGNALS

Filed Nov. 2, 1966 3 Sheets-Sheet 2

INVENTOR
EISUKE FUJIMOTO

Jan. 6, 1970 EISUKE FUJIMOTO 3,488,750

AUTOMATIC SOUND VOLUME CONTROL ARRANGEMENT PRESERVING RELATIVE MAGNITUDES OF INPUT SIGNALS

Filed Nov. 2, 1966 3 Sheets-Sheet 3

INVENTOR
EISUKE FUJIMOTO

United States Patent Office 3,488,750
Patented Jan. 6, 1970

3,488,750

AUTOMATIC SOUND VOLUME CONTROL ARRANGEMENT PRESERVING RELATIVE MAGNITUDES OF INPUT SIGNALS

Eisuke Fujimoto, Tokyo, Japan, assignor to Akai Electric Company Limited, Higashi-Kohjiya, Ohta-ku, Tokyo, Japan, a corporation of Japan Filed Nov. 2, 1966, Ser. No. 591,508
Claims priority, application Japan, May 12, 1966, 41/30,208
Int. Cl. G11b *5/74*
U.S. Cl. 179—1 5 Claims

ABSTRACT OF THE DISCLOSURE

An automatic sound volume control arrangement is disclosed wherein the degree of attenuation is increased by an attenuator when an output signal from the attenuator exceeds the distortion level for recording. The degree of attenuation remains unchanged when the signal is below the distortion level. Thus, all of the signals to be recorded are attenuated to the same degree thereby preserving their relative magnitudes with no loss of musical fidelity.

This invention relates to improvements in and relating to automatic sound volume control systems, especially adapted to be used with magnetic tape recorders.

One of the main disadvantages of the prior art automatic volume control systems is that the signal noise ratio decreases because the ambient or background noises are introduced at an elevated signal level, as will be more fully described hereinafter. This results in a considerable limitation in providing automatic volume control for high quality magnetic tape recorders.

The main object of the present invention is therefore to provide an automatic sound volume control system, particularly adapted for use with magnetic tape recorders which is capable of improving the signal to noise ratio and thus assuring a substantially improved fidelity.

A further object of the present invention is to provide such an automatic volume control system which is capable of reproducing a musical recording with as high fidelity as possible of reproduced sounds.

A still further object of the present invention is to provide such a system which is simple in its design, reliable in its operation and economic in its production.

Figure 1:
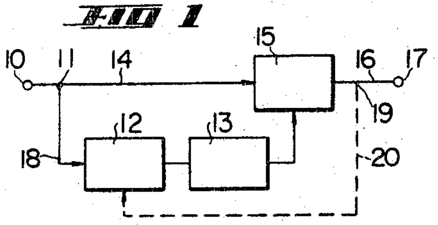
Figure 2:
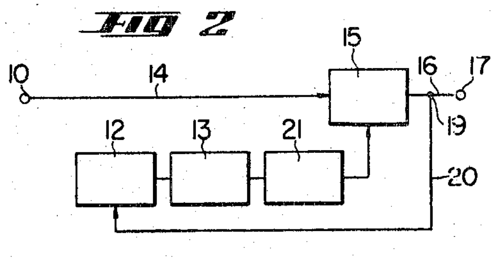
Figure 3:
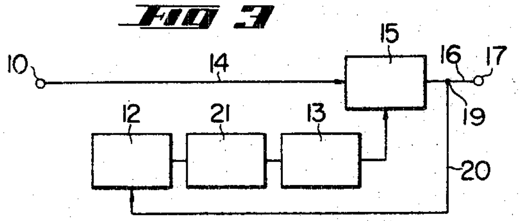
Figure 5:
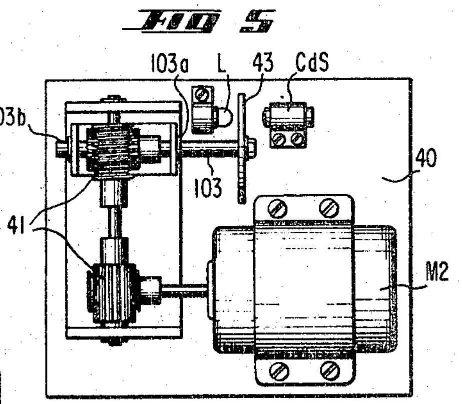
Figure 4:
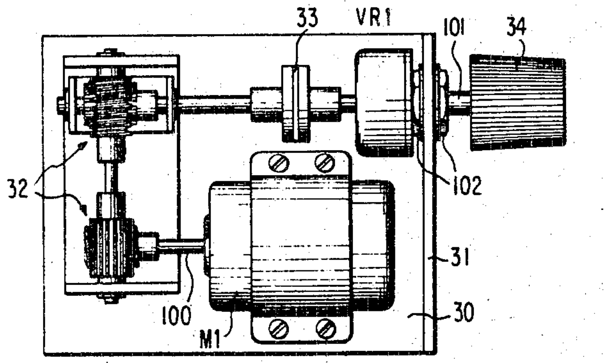
Figure 6:
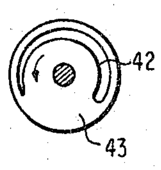
Figure 7:
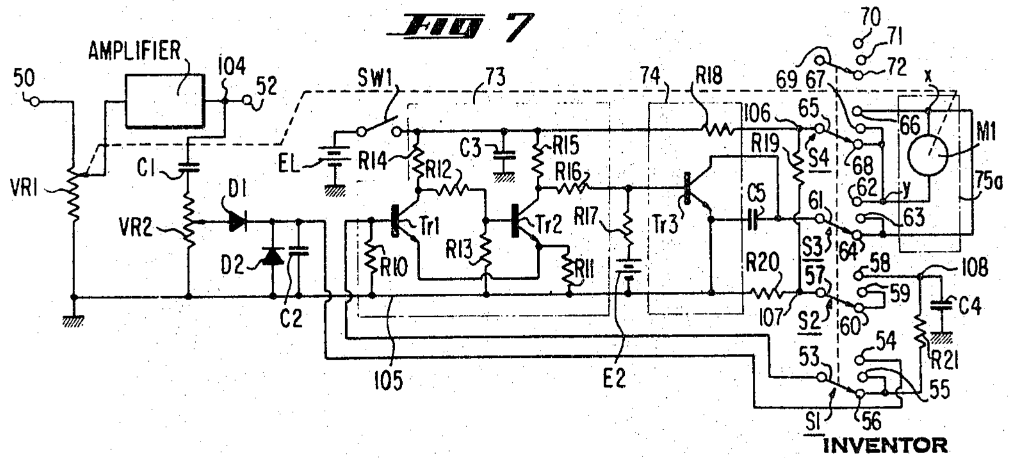
Figure 8:
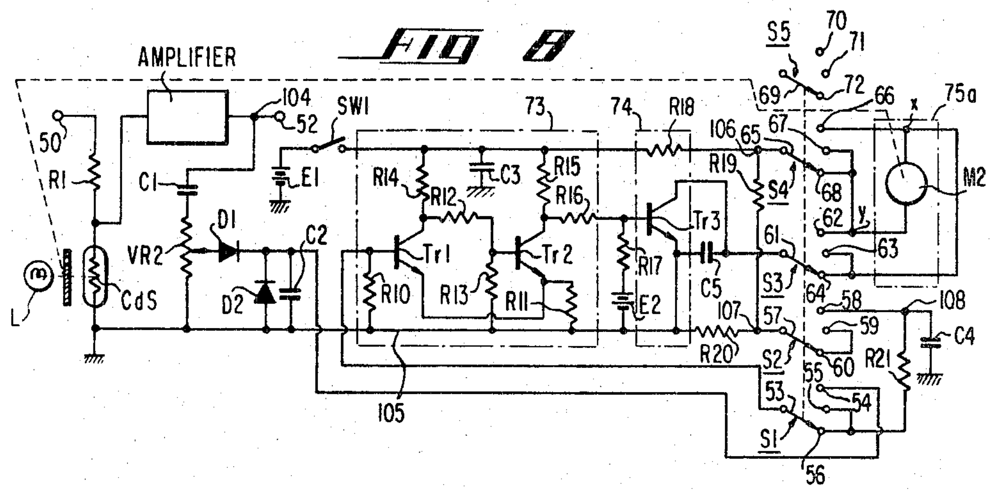
Figures 9, 10:
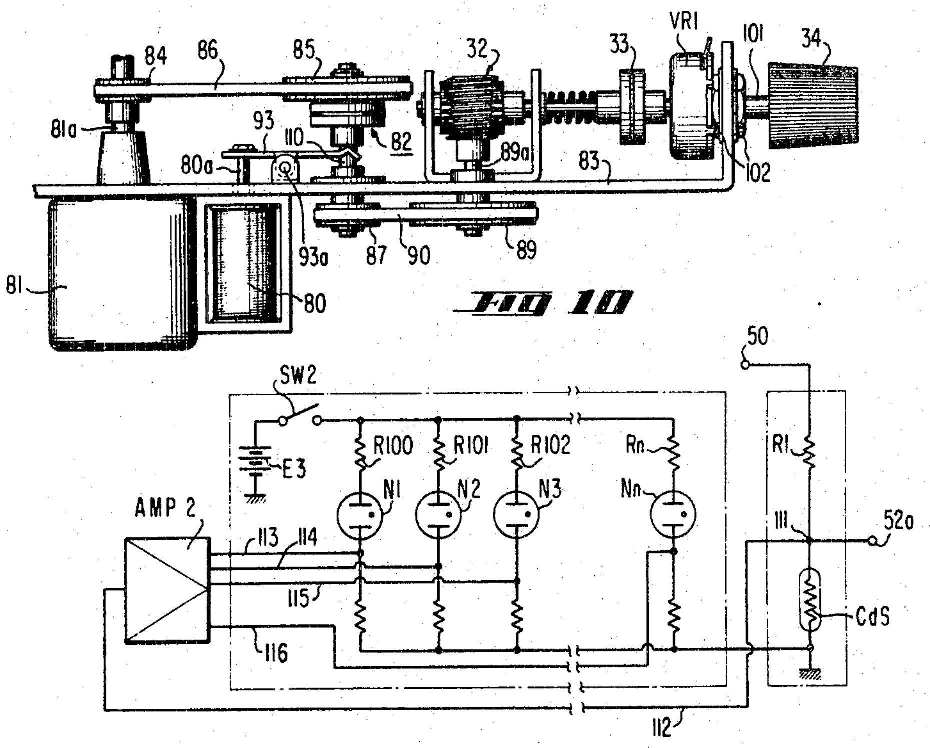
Figure 11:
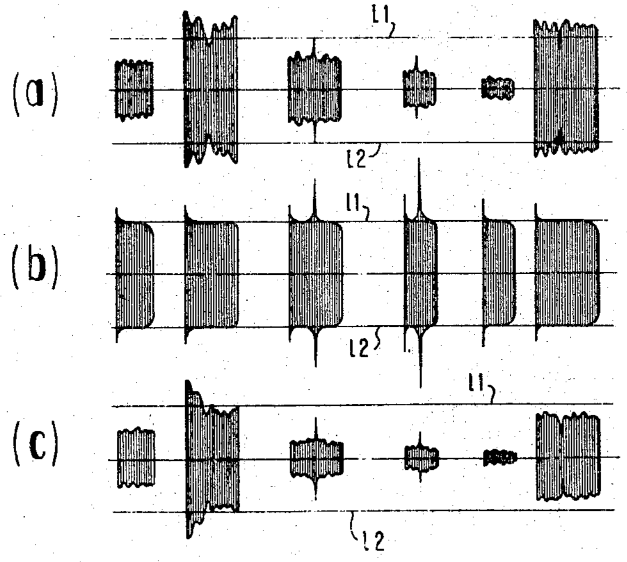

These and further objects, features and advantages of the invention will become more apparent after reading the following detailed description in conjunction with the accompanying drawings, in which:

FIGURE 1 is a block diagram showing a prior art system,

FIGURES 2 and 3 show two preferred embodiments of the invention in block diagram form, FIGURES 4 and 5 are top plan views of two different embodiments of a memory which may be used with the invention, FIGURE 6 is a front view of a slit disc provided in the memory shown in FIGURE 5 and adapted for cooperation with a photoelectric element, FIGURE 7 is a schematic diagram of a circuit which may be used to implement the invention, FIGURE 8 is a slight modification from the circuit shown in FIGURE 7, FIGURE 9 is a memory modified from those shown in FIGURES 4 and 5, FIGURE 10 is a schematic diagram, partially shown in block form, of a memory comprising a plurality of neon tubes, and FIGURE 11 shows comparative wave curves illustrating the novel effects according to this invention in comparison with those of the prior art.

Referring now to FIGURE 1 of the accompanying drawings, a conventional prior art volume control system is briefly described in advance of a detailed disclosure of the present invention.

Audio signal current is supplied from a microphone, not shown, to input terminal 10 and then conveyed through junction point 11 and conductor 18 to signal level sensor 12, only schematically shown by a block. When the audio signal level exceeds a predetermined value chosen for proper recording, an output is supplied from the sensor 12 to control circuit 13, again shown only schematically by a block, and actuates the latter which is electrically connected to attenuator 15. When the attenuator is actuated it controls the input signal conveyed from terminal 10 through junction 11 and conductor 14 so as to reduce the signal delivered over conductor 16 to output terminal 17 to a predetermined level. This terminal is electrically connected to a conventional magnetic recording system for carrying out the recording operation at the correspondingly reduced signal level.

As an alternative arrangement as shown by a dotted line 20, a part of the output from attenuator 15 is fed back through a junction point 19 to signal level sensor 12 so as to cause the latter to perform a similar function relying upon the level of signal output fed from attenuator 15 to output terminal 17, without relying upon the input signal level impressed upon the input terminal 10. In this modified arrangement, the input branch conductor 18 is naturally dispensed with. In this way, a predetermined constant signal level can be maintained at the output terminal 17.

As may be understood from the foregoing, the typical prior art arrangement functions so that an excessive input signal is subjected to intentional attenuation so as to deliver a constant output signal level. An arrangement such as this will function in a satisfactory manner when a simple input signal wave such as those produced by measuring instruments or the like is processed so as to deliver an output signal at a constant level. If, however, such an arrangement is employed in more complicated and delicate machines such as high quality tape recorders or the like wherein musical or other highly delicate signal information is to be treated, various strong musical tones such as fortissimo, pianissimo and the like are always kept at a substantially constant level which results in a considerable and substantial loss of musical fidelity.

Another drawback encountered with use of the aforementioned prior art arrangement is that when conversational tones comprise the input signal, ambient noises having nothing to do with the conversation are recorded during interrupted periods thereof at the predetermined constant volume level intended for the recording of the conversation.

Referring now to FIGURES 2 and 3, a first embodiment of the invention and a modification thereof will be described in detail. In both figures reference numerals 10 through 20 denote same circuit components which were described in connection with FIGURE 1.

In the first embodiment shown in FIGURE 2 there is provided a memory device 21 between control circuit 13 and attenuator 15, while in the modification shown in FIGURE 3 the memory device 21 is inserted between signal level sensor or detector 12 and control circuit 13, details of the device 21 being set forth hereinafter more in detail.

Audio signal current is supplied from a microphone, not shown, to input terminal 10 and then conveyed to the attenuator 15 through conductor 14. An output signal from the attenuator 15 is applied to the detector 12. When the output signal exceeds the predetermined level the higher signal is sensed by detector 12 whose output actuates control circuit 13 which in turn energizes attenuator 15 in the same manner previously described with reference to FIGURE 1. In the present embodiment, however, the output signal from the control circuit 13 is retained in the memory 21. Therefore, even when the output signal from the attenuator 15 drops below the predetermined level, the degree of attenuation at 15 remains unchanged until a further signal higher than the predetermined level arrives at detector 12. When the output signal from the attenuator 15 decreases beyond the predetermined level, the attenuator will not be further changed and thus an output signal will thereafter be delivered therefrom as a linear function of the input signal.

When a higher signal than the predetermined level is applied to the input terminal 10 of the modified arrangement shown in FIGURE 3, it is detected as usual by detector 12 and the detected signal is stored in memory 21. The attenuator 15 is then actuated through the control circuit 13 under the influence of the stored signal. Therefore, in the same manner as was described with reference to FIGURE 2, the degree of attenuation input will be kept constant until a further input signal higher than the predetermined signal level is applied to the detector 12.

FIGURE 4 shows a detail view of motorized memory shown in FIGURE 7 at *75a* in combination with a variable resistor VR1 shown in the latter figure and acting as the attenuator 15.

In FIGURE 4, a mounting base 30 is formed with a vertical end wall 31 and is mounted in turn on a tape recorder, not shown. An electric motor M1 is mounted on the base 30, said motor being shown only schematically in its outer configuration. The wiring connection with a power source has been omitted for simplicity of the drawing. The rotor shaft at 100 is mechanically connected through the intermediary of a two-stage reduction gear 32 and a friction coupling 33 with the slider, not shown, of variable resistor VR1 hereinafter called the attenuator. The slider is rigidly connected by a common shaft 101 with a manual knob 34, the latter shaft being rotatably mounted in bearing means 102 which is in turn rigidly supported on the end wall 31.

It is therefore easily understood that when motor M1 is rotated in one or another direction, rotation is transmitted through gearing 32 and clutch 33 so as to regulate the resistance value of the attenuator VR1.

It should be noted that before operating the tape recorder the attenuator is adjusted by manipulating the knob 34 to set the starting point of attenuation. A manual adjustment of volume control may be carried into effect by manipulating the knob. This manipulation will not interfere the motion of the motor M1 because the gearing 32 is designed in the form of worm gearings, as shown, and, in addition, there is provided friction clutch 33 between the attenuator and the gearing, as was already mentioned.

In a slightly modified arrangement shown in FIGURE 5, mounting base 40 similar to that denoted 30 in FIGURE 4, mounts an electric motor M2 which is mechanically connected through a two-stage reduction gearing, preferably in the form of worm gearings 41, and shaft 103 to a slit disc 43 carried fixedly by the latter. The shaft 103 is rotatably mounted in bearings 103*a* and 103*b* which are mounted in turn fixedly on the base 40. As shown in FIGURE 6, the disc 43 is formed with a curved slit 42 which presents a variable passage area for the light beams emanating from a lamp L toward a photoelectric cell *CdS*, both being fixedly mounted on the base 40. For simplicity, the wiring connections of the lamp and photoelectric cell have been omitted. It will be clear that when rotation is transmitted from motor M2 through reduction gearing 41 and shaft 103 to the slit disc 43 so as to alter the quantity of light beams passing through the variable area slit 42, the resistance value of the photoelectric cell CdS is modified in proportion to the degree of rotation. Referring now to FIGURE 7, numeral 50 denotes an input terminal adapted for electrical connection with a microphone, pick-up or the like audio signal source, not shown. Between this input terminal and ground there is inserted the attenuator VR1, the slider of which is connected electrically to the input of an amplifier contained in the tape recorder. The output of the amplifier is electrically connected through a junction point 104 to an output terminal 52 adapted to be connected with a magnetic recording head in a recorder, not shown. It is to be noted that when the recorder is manipulated to operate in its reproducing mode, the output terminal 52 is connected to a loud speaker, not shown.

The junction point 104 is connected electrically through a series connection of coupling condenser C1 and variable resistor VR2 to ground, the slider of the resistor being electrically connected through a rectifier circuit comprising diodes D1, D2 and a ripple-suppressing condenser C2 to a stationary contact 54 of a transfer switch S1.

Block 73 denotes a volume level sensing circuit which comprises transistors T*r*1 and T*r*2 constituting in combination a Schmitt trigger circuit or multivibrator. A base resistor R10 for biasing purposes is inserted between the base electrode of transistor T*r*1 and ground line 105, while the emitter electrodes of these transistors are directly connected to each other. The emitter electrode of transistor T*r*2 is connected through emitter resistor R11 for biasing purposes, to the ground line 105 and the collector electrode of transistor T*r*1 and the base electrode of transistor T*r*2 are connected through coupling resistor R12. Between the base electrode of transistor T*r*2 and the ground line 105, a biasing resistor R13 is inserted. The related parts are so arranged that when switch SW1 is closed, the voltage of D.C. source E1 is fed through resistors R14 and R15 to the collector electrodes of the both transistors. Condenser C3 serves to suppress ripples delivered from the Schmitt trigger, while resistor R16 connected to the output side of the trigger circuit, or more specifically, to the collector electrode of transistor T*r*2, serves as a buffer resistor.

As shown, the base electrode of transistor T*r*1, serving naturally as the input of the volume level sensing circuit 73, is connected electrically with the movable contact at 53 of transfer switch S1, while the other end of series-connected resistor R16 is electrically connected to the base electrode of switching transistor T*r*3 included in a control circuit 74. Resistor R17 is a base biasing resistor of the transistor T*r*3 and a D.C. voltage source E2 is provided for the same purpose. The emitter electrode of this transistor is connected to ground and the collector electrode of the transistor is electrically connected to the movable contact 61 of transfer switch S3 adapted for cooperation with stationary contacts 62–64 of which those denoted 63, 64 are connected to a terminal, denoted *x*, of the electric motor M1, also shown in FIGURE 4, thence further to one of stationary contacts 66 of a transfer switch S4. Stationary contact 62 of the transfer switch S3 is connected with another terminal *y* of the motor M1, thence further to stationary contacts 67 and 68 of transfer switch S4. The movable contact 65 is electrically connected through junction point 106, resistor R18 and switch SW1 to the positive electrode of D.C. voltage source E1. Junction 106 is electrically connected through resistor R19 and junction point 107 to the movable contact 57 of switch S2. Junction 107 is connected through a resistor R20 to the ground line 105. Stationary contacts 59 and 60 of switch S2 are connected with each other, while the remaining stationary contact 58 is connected through a large charging condenser C4 and a junction 108 to ground. Junction 108 is connected through a resistor R21 to stationary contact 56 of transfer switch S1, contact 56 being connected with a further stationary contact 55. Between the emitter and collector electrodes of transistor *Tr*3, there is inserted a condenser C5 for absorbing noise currents generated during the starting of the electric motor M1.

Transfer switches S1, S2, S3, S4 and S5 are ganged together of which the last one at S5 is adapted for the control of the operative functions of the tape recorder, such as recording, reproducing and off-service. In FIGURE 7 these switches are shown when the machine is at rest.

When the movable contact 69 of transfer switch S5 is transferred from the shown position to stationary contact 70, the machine is brought into its recording operation and the movable contacts 53, 57, 61 and 65 of transfer switches S1, S2, S3 and S4 are brought respectively into contact with stationary contacts 54, 58, 62 and 66.

When the movable contact 69 of transfer switch S5 is operated from its illustrated position to stationary contact 71, the tape recorder is in its reproducing mode, and the movable contacts 53, 57, 61 and 65 of switches S1, S2, S3 and S4 are brought respectively into contact with stationary contacts 55, 59, 63 and 67.

The slider of attenuator VR1 is so related with the rotor of motor M1 that when the latter is caused to rotate in its normal direction, the slider is moved in the downward direction when seen in FIGURE 7, so as to increase the attenuation degree of the input signal, and vice versa.

The operation of the arrangement shown in FIGURES 4 and 7 is as follows. At first, the slider of variable resistor VR2 is properly adjusted so as to preset the signal level detector 73 to its proper operating condition for carrying out the desired optimum recording. This presetting is normally done in the course of manufacture of the tape recorder.

Then, the switch S5 is transferred from its rest position shown to its recording position in the manner already referred to. Next, the switch SW1 is manually closed to supply voltage from the source E1 to the circuit. At the same time, the battery voltage is impressed from the positive side of the source E1 through resistor R18 and contacts 65 and 66 to the terminal *x* of motor M1.

The slider of attenuator VR1 is positioned in this case at its initial point or more specifically to its position of low resistance value, adapted for representing the minimum attenuation to the input signal to be processed.

The Schmitt trigger circuit in the signal level detector 73 does not operate unless a higher trigger signal than a predetermined voltage level is fed to it. Therefore, an audio input signal lower than the predetermined level is subjected to no attenuation and will be delivered through output terminal 52 to the tape recorder after being amplified to a proper recording level.

When an audio signal higher than the predetermined level is impressed upon the terminal 50, it is conveyed through variable resistor VR1, the amplifier, coupling condenser C1, variable resistor VR2, the rectifier circuit comprising diodes D1 and D2 and condenser C2 and contacts 54 and 53 of switch S1 to the base electrode of transistor *Tr*1, which is thus switched to its conductive state. Current flows therefore from the source E1 through switch SW1, resistor R14, collector-emitter passage of transistor *Tr*1 and resistor R11 to ground. The increased drop across resistor R14 results in transistor *Tr*2 being switched from its conductive to off-state. Therefore, an output signal from the circuit 73 will be conveyed from the output end of resistor R16 to the base electrode of transistor *Tr*3 contained in the control circuit 74 which can be deemed the same as that denoted by reference numeral 13 in the foregoing description with reference to FIGURES 1–3. At this moment, the switching transistor *Tr*3 is turned from its off to conductive state. Therefore, current will flow from terminal *x* through motor M1, terminal *y*, contacts 62 and 61, and the collector-emitter path of transistor *Tr*3 to ground. The motor M1 thus rotates in the normal direction to move the slider of variable resistor VR1 in the downward direction when seen in FIGURE 7, until the input audio signal is attenuated to the predetermined signal level for avoiding excessive distortion. When the input signal is thus attenuated, the transistor *Tr*1 turns off and the initial operating condition will be recovered, yet the thus established attenuating condition to the input audio signal will be maintained, until a further audio signal higher than the now received highest input signal level should be fed to terminal 50. More specifically, even when the attenuator is operated in the above-mentioned manner and an input signal having an intermediate intensity between the foregoing highest input signal which caused the attenuator to operate and the predetermined signal level is applied to the terminal 50, the degree of attenuation will not be altered. All input signals lying below the predetermined signal level will naturally be subjected to the thus established attenuation. When a new input signal higher than the highest received signal which caused the attenuator to operate is applied to the terminal 50 the arrangement so far described will operate to further increase the degree of attenuation.

In the course of the recording operation of the tape recorder, electric charge is conveyed from the source E1 through closed switch SW1, resistors R18 and R19, junction 107, contacts 57 and 58 and junction 108 to condenser C4 which is thus charged.

When the recording is concluded, and the operator switches the operation of the machine either to its reproducing mode or to its off-service position, by manipulating the gang-connected switches S1, S2, S3, S4 and S5 so as to bring movable contacts 53, 57, 61, 65 and 69 respectively to stationary contacts 55, 59, 63, 67 and 71, or alternatively, stationary contacts 56, 60, 64, 68 and 72, the accumulated charge in condenser C4 will be discharged through resistor R21, stationary contact 55 or 56, movable contact 53 of switch S1 and resistor R10 to ground. The voltage appearing in this case at the resistor R10 is impressed upon the base electrode of transistor *Tr*1 which is therefore rendered conductive and thus the aforementioned operation of Schmitt trigger circuit becomes effective to make the switching transistor *Tr*3 conductive. In this case, however, current will flow from the source E1 through the closed switch SW1, resistor R18, junction 106, contacts 65 and 67 or 68 of switch S4, terminal *y*, motor M1, terminal *x*, stationary contact 63 or 64, movable contact 61 of switch S3, and the collector-emitter path of transistor *Tr*3 to ground, thereby causing the motor M1 to rotate in the reverse direction so that the slider of attenuator VR1 may be brought back to its initial position.

In the modified arrangement shown in FIGURES 5 and 8, the attenuator consists of a fixed resistor R1 and the photoelectric element *Cd*S, the resistance of the latter being controlled by the passage rate of light beams emanating from lamp L through variable slit 42 toward the sensitive element, as was previously described. Other constituents in the present modified arrangement are similar to those shown in FIGURE 7. In this case, however, the motor acting as the main component of the memory has been designated by M2 for better identification.

When the motor M2 is rotated in its normal direction in the same manner as explained in connection with FIGURES 4 and 7, slit disc 43 is rotated in the counterclockwise direction in FIGURE 6 to decrease the resistance value of the photoelectric element *Cd*S, and vice versa. Thus, similar results may be obtained as before.

In FIGURE 9 a somewhat modified memory mechanism is shown. A main drive motor 81 for the tape drive of the recorder is mounted on an auxiliary panel 83 which is rigidly supported by the main deck panel, not shown, of the recorder. In proximity to the main motor 81 there is provided an electromagnet 80 also mounted on the auxiliary panel 83 having an armature 80*a* which carries at its top end an actuating lever 93 with its one end hinged thereto. The lever 93 is pivotally supported at its intermediate point at 93*a* and its free end is loosely engaged with a recessed clutch shaft 110, so as to engage or disengage a clutch, generally shown by 82. The upper clutch member of the clutch 82 is integral with pulley 85 which is drivingly connected by means of belt 86 with a further pulley 84 rigidly mounted on motor shaft 81*a*.

Clutch shaft 110 mounts a pulley 87 which is drivingly connected with pulley 89 by belt 90. Pulley shaft 89*a* for the pulley 89 carries a reduction gear 32 which has a similar design as described with reference to FIGURE 4. Numerals or symbols 33, VR1, 34, 101 and 102 signify similar constituents as in FIGURE 4.

In operation, the electromagnet 80 is energized when the memory motor 81 is brought into rotation in its normal direction, although the wiring connection therefor is not specifically shown. Motion is transmitted from the magnet through armature 80*a*, actuating lever 93 and clutch shaft 110 to clutch 82 which is thus brought into engagement. Rotation will therefore be transmitted through motor shaft 81*a*, pulley 84, belt 86, pulley 85, clutch 82, shaft 110, pulley 87, belt 90, pulley 89, shaft 89*a*, gearing 32, clutch 33 and shaft 101 to variable resistor VR1, the latter being adjusted as before. This mode of operation naturally corresponds to the case wherein a higher input signal than the prescribed optimum level is impressed to input terminal 50 shown in FIGURES 7–8.

When the electromagnet 80 is kept in its de-energized position, corresponding to the rest position of said memory motor 81, no motion is transmitted from the motor to the variable resistor or attenuator VR1.

Other functions of this mechanism may be easily understood by reference to the foregoing description in connection with, especially, FIGURES 4 and 7. Briefly, however, when the tape recorder is switched either to its reproducing mode or to its idle position, the main motor 81 is driven in its reverse direction and the electromagnet 80 is also energized by the discharge current from condenser C4. Therefore, the attenuator VR1 is reset to its initial state.

In the memory arrangement shown in FIGURE 10, numeral 50 and symbols R1 and C*d*S correspond to those components shown in FIGURE 8, 52*a* being an output terminal which is adapted to connect to the aforementioned amplifier. A*mp*2 denotes an amplifier. Although not shown, photoelectric element C*d*S is so arranged that it is adapted to receive equal amounts of light beams emanating from a plurality of, herein shown only four, parallel connected neon tubes N1, N2, N3 . . . N*n* when these are illuminated.

When an audio signal lower than the predetermined optimum recording level is impressed as before upon input terminal 50, it is conveyed through fixed resistor R1, junction 111 and lead 112 to amplifier A*mp*2 and amplified therein. The amplifier and neon lamps N1, N2 and N3 . . . N*n* are arranged such that the output from the amplifier cannot ignite the lamps for this low level signal, and therefore the latter are kept in their extinguished conditions. Photoelectric element C*d*S does not receive in this case any light from the respective neon lamps and therefore it has a maximum resistance value so that the input audio signal is conveyed wtih practically no attenuation through resistor R1 and output terminal 52*a* to the recorder.

When, on the contrary, a higher audio signal than the optimum recording level is impressed upon input terminal 50, the amplified signal will be effective to ignite any one or more of said neon tubes, depending upon the intensity of the impressed audio signal conveyed through conductors 113–116. The illuminated neon lamp or lamps, as the case may be, depending upon the input signal intensity, emanate light beams therefrom through a conventional condensing means, not shown, generally comprising reflectors and condensing lenses, to photoelectric element C*d*S and thereby a proper degree of attenuation is imposed on the output signal at terminal 52*a*. It may be naturally understood that when initiating the recording operation, the switch SW2, is closed as in the case of SW1 in the foregoing embodiments.

The firing potentials of neon tubes N1, N2, N3 . . . N*n* are set in an increasing order through the proper selection of the biasing resistors R100, R101, R102 . . . R*n*.

Even when the input signal is thus attenuated, the neon lamp or lamps will continue to illuminate and thus the now established attenuation degree will be preserved until the reset switch SW2 is reopened or a new higher signal is impressed upon input terminal 50.

Upon reviewing several wave forms shown in FIGURE 11, the effects of the inventive arrangement will be understood more clearly.

In FIGURE 11(*a*) a sample of an interrupted series of input audio signals subjected to no attenuation is shown. It is assumed that when the signal width extends beyond a pair of critical lines 11 and 12, it is highly distorted in its tone quality when recorded and reproduced. In FIGURE 11(*b*) the results with use of conventional A.V.C. is shown.

As may be seen, the fidelity is considerably injured since only the signals whose magnitudes are greater than the critical values are attenuated. In FIGURE 11(*c*), which illustrates the results obtained by this invention, the same degree of attenuation is applied to all input signals to preserve their relative magnitude relationship. This inherently produces a much truer and more realistic tone fidelity.

What is claimed is:

1. In an automatic volume control system for a magnetic tape recorder and reproducer including means for receiving audio signals, means for sensing the magnitude of the signals and producing an output whenever they exceed a predetermined level, and means responsive to the sensing means for attenuating the signals, the improvement comprising:

memory means responsive to the sensing means for controlling the attenuating means once actuated to thereafter maintain the highest level of attenuation applied to the signals, whereby all of the subsequent signals are attenuated to the same degree to thereby preserve their relative magnitude relationship.

2. An automatic volume control system as defined in claim 1 wherein (a) the attenuator means comprises a variable resistor, and (b) the memory means comprises an electric motor for driving the resistor to vary its value.

3. An automatic volume control system as defined in claim 2 wherein the variable resistor may also be manually adjusted.

4. An automatic volume control system as defined in claim 1 wherein (a) the attenuating means comprises a photoresistor, and (b) the memory means comprises an electric motor for driving a variable aperture member positioned between the photoresistor and a light source.

5. An automatic volume control system as defined in claim 1 wherein (a) the attenuator means comprises a photoresistor, and (b) the memory means comprises a bank of parallel connected neon lamps for illuminating the photoresistor and having successively higher threshold potentials.

References Cited

UNITED STATES PATENTS

| | | |
|---|---|---|
| 2,486,480 | 11/1949 | Kimball et al. |
| 2,551,150 | 5/1951 | McGoffin. |

| | | |
|---|---|---|
| 2,668,874 | 2/1954 | Augustadt et al. |
| 3,296,373 | 1/1967 | Suganuma. |

FOREIGN PATENTS

| | | |
|---|---|---|
| 997,978 | 7/1965 | Great Britain. |

KATHLEEN H. CLAFFY, Primary Examiner
T. L. KUNDERT, Assistant Examiner